United States Patent [19]  
King

[11] 3,761,062  
[45] Sept. 25, 1973

[54] METHOD AND APPARATUS FOR TREATING CARBURETED MIXTURES

[76] Inventor: Arthur S. King, 9013 W. 51st Ter., Merriam, Kans. 66203

[22] Filed: Apr. 28, 1972

[21] Appl. No.: 248,699

[52] U.S. Cl. .............. 261/1, 123/119 E, 261/79 R, 55/DIG. 28, 48/180 B, 48/180 R, 55/135, 55/127, 55/130, 55/145
[51] Int. Cl. .......................................... F02m 27/04
[58] Field of Search .................... 123/119 E; 261/1, 261/79 R; 55/DIG. 28, 134, 135, 145, 130, 127; 48/180 R, 180 B

[56] References Cited
UNITED STATES PATENTS

| | | | |
|---|---|---|---|
| 607,441 | 7/1898 | Kohl | 55/444 |
| 892,378 | 6/1908 | Martini | 123/119 E |
| 1,333,836 | 3/1920 | Csanyi | 123/119 E |
| 1,771,626 | 7/1930 | Hamilton | 123/119 E |
| 1,905,053 | 4/1933 | Powell | 55/135 |
| 2,705,941 | 4/1955 | Unschuld | 123/119 E |
| 2,974,747 | 3/1961 | Coolidge, Jr. et al. | 55/124 |
| 2,983,332 | 5/1961 | Vicard | 55/135 |
| 3,266,783 | 8/1966 | Knight | 123/119 E |
| 3,537,829 | 11/1970 | Ott | 123/119 E |

Primary Examiner—Tim R. Miles
Attorney—Gordon D. Schmidt et al.

[57] ABSTRACT

A mixture of air, water vapor and droplets of fuel, such as a hydrocarbon type, is treated to assure complete combustion of the fuel to thereby minimize polluting emissions by passing the mixture through an electrostatic field in a heat exchange chamber having reduced pressure. Exposure to the field relaxes the surface tension of the fuel droplets to increase vaporization thereof, and physical contact of the mixture with heat exchange structure during fuel vaporization causes the water vapor of the mixture to condense for separation from the air and fuel vapor. One embodiment has concentric tubular electrodes which house the outlet for fuel vapor and air to prevent remixing of water condensation therewith, and a second embodiment has superimposed, plate-like electrodes which shield the fuel vapor and air outlet from water condensation and serve to break up fuel droplets by forcing the same to follow a tortuous, serpentine path through the field.

31 Claims, 4 Drawing Figures

PATENTED SEP 25 1973 3,761,062

METHOD AND APPARATUS FOR TREATING CARBURETED MIXTURES

This invention relates to the field of environmental pollution control and has as an important object to provide a method and apparatus for treating a mixture of air, water vapor and droplets of volatile fuel immediately before the mixture enters the intake manifold of an internal combustion engine in a manner to assure more complete combustion of the fuel to thereby eliminate or substantially reduce polluting emissions in the exhaust of the engine.

More particularly, an important object of the present invention is to provide a treater which subjects the mixture issuing from the carburetor to an electrostatic field which induces the fuel droplets to relax their surface tension and thereby more fully vaporize before entering the combustion chambers of the engine.

An additional object of the invention of equal importance to the goal of causing complete vaporization of the fuel droplets is to condense and separate water vapor from the mixture, which water vapor would otherwise retard combustion and thereby increase polluting emissions.

As a corollary to the above, it is an important object of the instant invention to provide a treater in which the field-establishing electrodes thereof are arranged and configured to facilitate separation of water condensation from fuel vapor and air by shielding the outlet for fuel vapor and air from water condensation.

Another important object of the present invention is not only to reduce polluting emissions through use of the above treater, but also to increase engine operating efficiency to the end that fuel is used more economically without a corresponding loss in power output.

A further important object of the instant invention is the provision of means for creating reduced pressure in the treater as the mixture is drawn therethrough whereby to further relax surface tension on the fuel droplets and thereby enhance vaporization thereof.

An additional important object is the provision of a helical heat exchange vane within the electrostatic field of the treater disposed for physical contact with the mixture to augment condensing of water vapor from the mixture and to impart a swirling action to the mixture which increases the amount of time the mixture is exposed to the field and throws the relatively heavy water to the outside of the swirling mixture.

Still another important object of the invention is the provision of a treater having a series of superimposed, plate-like electrodes disposed to augment fuel droplet breakup by virtue of forcing the mixture being treated to follow a tortuous, serpentine path of travel during its journey through the field.

Figure 1:
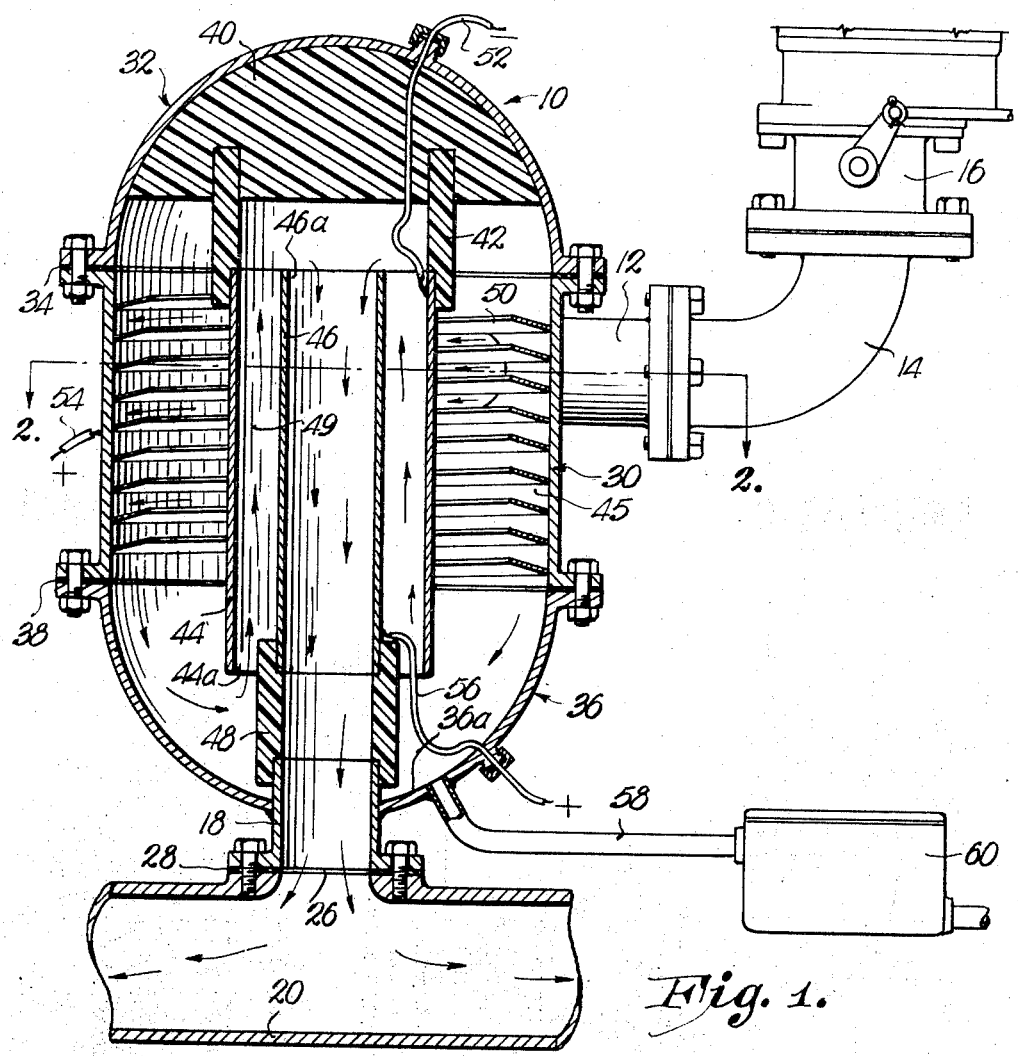
FIG. 1 is a fragmentary, vertical cross-sectional view of a treater constructed in accordance with the present invention and coupled at its inlet and outlet respectively with a carburetor and engine intake manifold.
Figure 2:
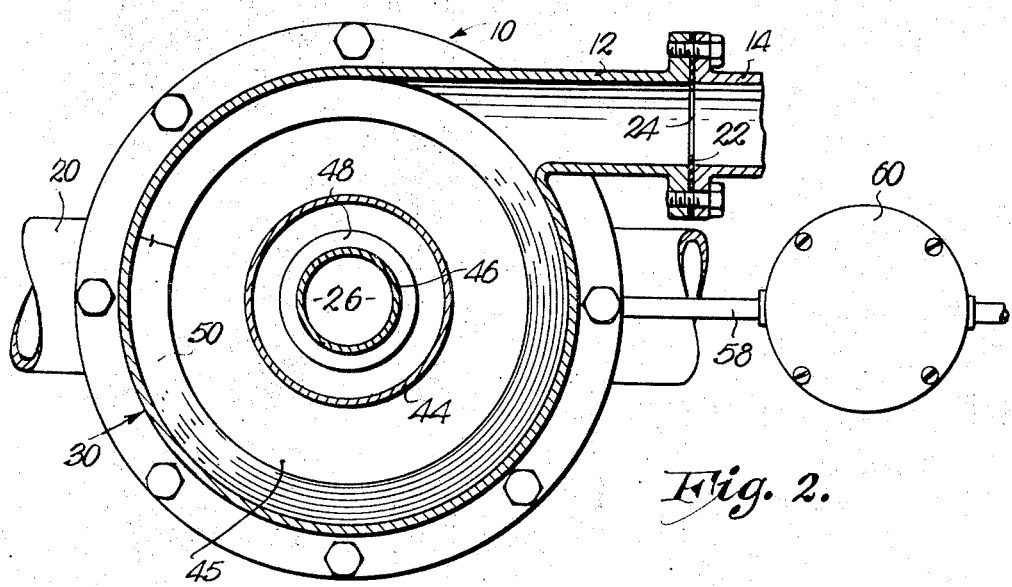
FIG. 2 is a fragmentary, horizontal cross-sectional view of the treater taken along line 2—2 of FIG. 1.

Treater 10 in FIGS. 1 and 2 has an inlet pipe 12 coupled with a conduit 14 for receiving a combustible mixture from carburetor 16, and an outlet pipe 18 coupled with the intake manifold 20 of an internal combustion engine (not shown). An insulated insert or disc 22 (FIG. 2) clamped between inlet pipe 12 and conduit 14 has an opening 24 of smaller diameter than a corresponding opening 26 in an insulating gasket 28 (FIG. 1), clamped between outlet pipe 18 and intake manifold 20 to create reduced pressure within treater 10 and manifold 20 during operation as will hereinafter be described in detail.

The treating chamber of treater 10 is defined primarily by a continuous electrode wall 30 which is joined tangentially by the inlet pipe 12 as shown in FIG. 2. A hemispherical cap 32 is clamped to wall 30 in an airtight manner using a gasket 34, while a hemispherical basin 36 closes the opposite end of wall 30 in a similar fashion using a gasket 38. Preferably, wall 30, cap 32 and basin 36 are of aluminum or any other suitable metal having high-heat exchange properties.

A mass 40 of epoxy or the like is bonded to the interior surface of cap 32 and carries an insulating and supporting cylinder 42 embedded therewithin, the cylinder 42, in turn, suspending a metal tubular electrode 44 concentrically within wall 30 in spaced relationship to the latter to define an annular region 45 therebetween. A metal tube 46 of smaller diameter than electrode 44 is supported coaxially within the latter and in spaced relationship thereto by a second insulating and supporting cylinder 48, the cylinder 48, in turn, being mounted on the outlet pipe 18 which projects upwardly through the floor 36a of basin 36. Electrode 44 thus effectively houses tube 46 and cooperates with the latter to define an annular flow passage 49 communicating with region 45 through the entrance 44a at the lower end of electrode 44 and with outlet pipe 18 through the open upper end 46a of tube 46. Entrance 44a is spaced above the floor 36a longitudinally of tube 46 as shown.

A continuous helical heat exchange vane 50 fixed to the inner surface of wall 30 encircles electrode 44 in spaced relationship thereto within region 45 and leads generally from inlet pipe 12 toward basin 36 in counterclockwise direction viewing FIG. 2. Electrode 44 and wall 30 serve as inner and outer electrodes respectively for creating an electrostatic field within region 45 and are adapted for connection by leads 52 and 54 across a source of electrical potential. Preferably, a positive charge is imparted to wall 30 and a negative charge to electrode 44, although such allocation of polarities is not a prerequisite to proper functioning of treater 10. A lead 56, coupled with tube 46, serves for creating a charge thereon opposite in polarity to that on electrode 44 to establish a second electrostatic treating field which is located within passage 49.

In operation, carburetor 16 provides an explosive airfuel mixture for intake manifold 20 by spraying the liquid fuel, such as a hydrocarbon, into the stream of ambient air drawn into carburetor 16 by operation of the engine. In most instances the fuel is not completely vaporized upon contacting the inrushing air, and instead, forms droplets which are entrained in the air and carried therewith to treater 10 without being thoroughly vaporized for combustion purposes. Moreover, depending upon environmental conditions, moisture is drawn into carburetor 16 in the form of water vapor along with the ambient air such that the mixture entering treater 10 through inlet pipe 12 acutally consists of air, water vapor, and droplets of fuel.

As the mixture enters the treating chamber, it is swirled in a counterclockwise direction by vane 50 through the electrostatic field in region 45. Vane 50 progressively guides the mixture toward the lower end of the treater 10 and through the electrostatic field, during which time the mixture is treated in a number of respects. First, it is believed that exposure to the electrostatic field in region 45 relaxes the surface tension of the fuel droplets and thereby encourages the droplets to vaporize completely and thoroughly mix with the air to provide a highly combustible product. Such relaxation of surface tension is believed to occur from a combination of phenomena including the alignment with electrodes 30 and 44 of water dipoles which cluster about hydrocarbon molecules within each droplet and the creation of an induced dipole condition within each carbon atom. By exposing the water dipoles to the opposite charges, they lose their affinity for the hydrocarbon molecules, hence relaxing surface tension of the fuel droplets.

In contrast to vaporization of fuel droplets, water is simultaneously condensed from the mixture during its journey through region 45 and is subsequently separated from fuel vapor and air. This is made possible by the fact that water has a greater surface tension than the hydrocarbon fuel droplets. Therefore, an electrostatic field may be provided which is high enough in intensity to break up fuel droplets, yet not prevent water droplet formation. Because of the heat absorbed by the fuel droplets during vaporization thereof, vane 50 and wall electrode 30 are cooled which, upon their contact with water vapor in the mixture, causes the water vapor to condense and be forced to the outer extremity of the mixture as it is swirled by vane 50 through region 45. The condensation is also drawn outwardly during swirling by the attraction of the water dipoles for the positively charged wall electrode 30, and this outward migration initiates separation of the condensation from air and fuel vapor.

After passing through region 45, condensation and air plus fuel vapor enter the area of basin 36, whereupon the heavy condensation is collected and retained against further movement with the air and fuel vapor. However, the air and fuel vapor continue to be drawn by operation of the engine and enter entrance 44a for flow through passage 49, during which time the air and fuel vapor are subjected to the effects of the second electrostatic field. This second field serves to promote further vaporization of any fuel droplets not previously reduced to their smallest size during passage through the initial field in region 45. After completing its passage through the second field, the air and fuel vapor is drawn into the open end 46a of tube 46 and thence out of treater 10 through outlet pipe 18 into manifold 20.

It is important to note that because of the constricted size of opening 24 in disc 22 as compared with opening 26 in gasket 28, the pressure throughout the interior of treater 10 and manifold 20 is reduced below that existing in conduit 14. This has the beneficial effect of reducing the external pressure exerted on each individual fuel droplet entering treater 10 such that expansion thereof is promoted to increase the rate of vaporization thereof. This, coupled with the surface tension relaxing action of the electrostatic field in treater 10, assures that an extremely high percentage of the fuel droplets are completely vaporized, hence causing complete combustion when the air and fuel vapor reach the combustion chambers of the engine. Tests have proven that by using treater 10, emissions of hydrocarbons, carbon monoxide, and nitrogen oxides may be very drastically reduced below levels existing without use of treater 10.

It is also important that the charge imparted to electrodes 30 and 44 and tube 46 be commensurate with the type of fuel being treated. For example, in treating gasoline, it has been found that a suitable field may be produced without a potential of a magnitude which would cause corona between the uninsulated electrode components. However, where heavier oils are to be treated, it may be necessary to increase the potential to such an extent that corona would normally be produced. In this instance, the electrode 44 and tube 46 may, for example, be coated with a suitable insulation material without detracting from the effectiveness of the treater.

A drainage line 58, coupled with basin 36, serves to drain the latter of collected condensation, and a reservoir 60 may be provided at the opposite end of line 58 for the drained condensation. A conventional filter (not shown) may be associated with reservoir 60 for separating water condensation from any fuel that may have been condensed, whereupon the separated fuel may be returned to carburetor 16 for mixture with the inrushing air.

Figure 3:
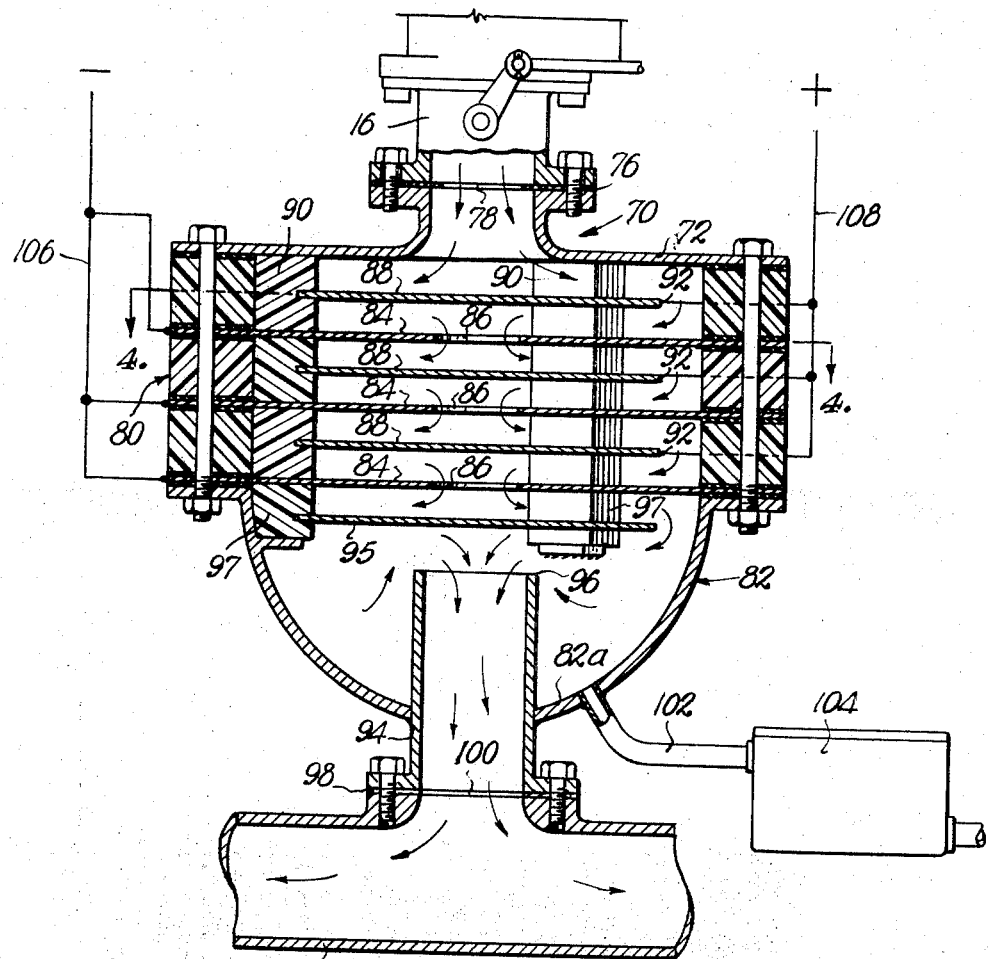
FIG. 3 is a fragmentary, vertical cross-sectional view similar to FIG. 1 of a second treater embodying the principles of the present invention.
Figure 4:
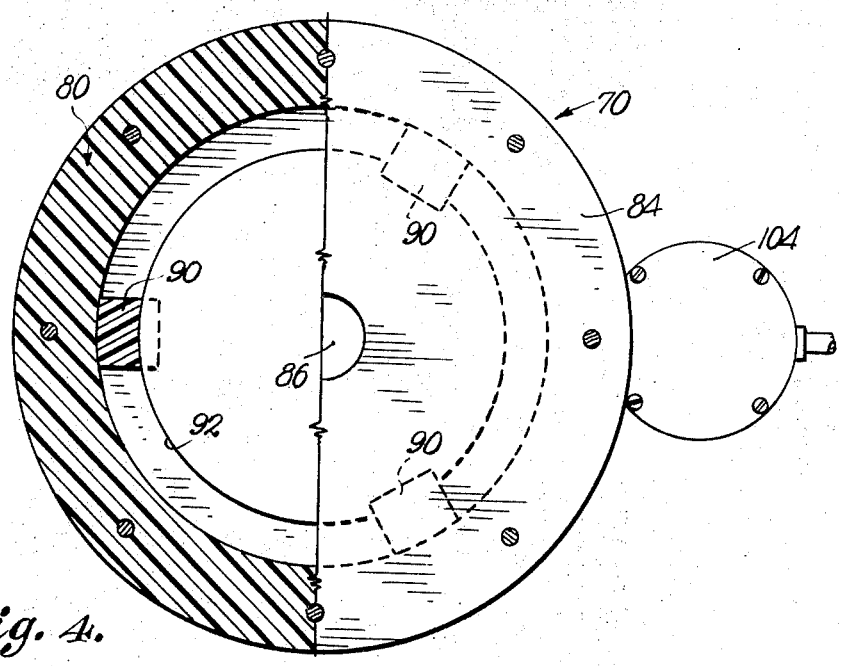
FIG. 4 is a fragmentary, horizontal cross-sectional view taken along line 4—4 of FIG. 3.

FIGS. 3 and 4 relate to a second treater 70 of modified construction but having many of the same basic principles of operation as treater 10. Treater 70 has a top plate 72 integral with a normally vertically extending inlet pipe 74 which is clamped to carburetor 16 for receiving combustible mixtures therefrom. Similar to the first embodiment, a disc-like, insulated insert 76 having a central opening 78, is clamped between carburetor 16 and inlet pipe 74.

The treating chamber of treater 70 is defined primarily by three superimposed, plastic or metal insulated rings 80 which are clamped between top plate 72 and a basin 82 forming the lower section of treater 70. Three normally horizontally extending, vertically spaced-apart electrode plates 84 are sandwiched between rings 80, each plate 84 being provided with a central opening 86. Three additional vertically spaced-apart, horizontally extending electrode plates 88 are alternately disposed between the three electrodes 84 and are supported by circumferentially spaced, insulated mounting blocks 90, each electrode 88 having an outermost peripheral edge 92 spaced from rings 80 to present an annular passage to the next adjacent plate 84.

An upstanding outlet pipe or tube 94 projects through the floor 82a of basin 82 and has an uppermost end 96 spaced substantially above floor 82a. A baffle 95 is supported by three additional mounting blocks 97 in overlying, protective relationship to tube end 96, and pipe 94 is clamped to intake manifold 20 with a gasket 98 therebetween having an opening 100 larger than opening 78 in disc 76. A drainage line 102 and reservoir 104 are coupled to basin 82 for functioning in a manner similar to that of line 58 and reservoir 70 of treater 10. edges Electrode sets 84 and 88 are adapted for connection via lines 106 and 108 respectively, across sources of electrical potential to establish charges of opposite polarity on adjacent electrodes 84 and 88. Preferably, electrodes 84 have a negative charge imparted thereto, while electrodes 88 have a positive charge imparted thereto, although it is to be understood that the polarity of such charges may be reversed without effecting the operation of treater 70. Moreover, the uppermost electrode pair 88 and 86 may be charged, for example, positively and negatively respectively, while the next pair may be reversely charged negatively and positively, the remaining pair then being reversely charged positively and negatively. By placing opposing charges on adjacent electrodes 84 and 88, an electrostatic field is established in the region existing therebetween which functions in a manner identical to the fields created within treater 10. As mentioned with regard to treater 10, one electrode of each adjacent pair may be provided with an insulating coating if required because of the nature of the fuel being treated.

As a mixture of air, water vapor and fuel droplets (which may be a hydrocarbon fuel) is drawn into treater 70 from carburetor 16, the mixture is forced to follow a tortuous course successively around the edtes 92 of electrodes 88 and through openings 86 in electrodes 84 for receiving the effects of the successive electrostatic fields. Such fields break up the hydrocarbon droplets by reducing the surface tension thereof and, moreover, breakup is promoted by a shock wave effect created by the tortuous movement of the droplets. As vaporization of the droplets thus occurs, electrodes 84 and 88 become cooled, whereupon the water vapor in the mixture is condensed and gravitates toward basin 82 for collection therein. Because of the strategic location of baffle 95 relative to the upper end 96 of outlet pipe 94, water condensation flowing over the edge of baffle 88 is diverted away from open end 96 into basin 82. However, the air and fuel vapor are free to enter pipe 94 for conveyance into intake manifold 20 and subsequent combustion within the engine. Note that throughout the treatment process, reduced pressure is provided withih treater 70 by virtue of the small size of disc opening 78 compared to disc opening 100 and the drawing action of the operating engine. This promotes hydrocarbon droplet vaporization as described with regard to treater 10.

Having thus described the invention, what is claimed as new and desired to be secured by Letters Patent is:

1. In combination with means for supplying a mixture of air, water vapor and droplets of volatile fuel, a mixture treater comprising
   means defining a heat-exchange chamber;
   means for establishing an electrostatic field within said chamber;
   inlet means communicating with the chamber for directing mixture into the field to relax the surface tension of said fuel droplets for vaporization of the latter while in the chamber;
   outlet means communicating with the chamber for directing air and vaporized fuel out of the chamber; and
   means for preventing water condensation formed during vaporization of the fuel droplets from exiting the chamber with air and vaporized fuel through said outlet means.

2. In a treater as claimed in claim 1, wherein is provided a basin for the condensation and wherein said outlet means has an opening spaced above the floor of said basin for air and fuel vapor.

3. In a treater as claimed in claim 2, wherein said outlet means includes a tube projecting into the chamber through the floor of said basin and having an open end presenting said opening.

4. In a treater as claimed in claim 3, wherein is provided means for deflecting condensation away from said tube end.

5. In a treater as claimed in claim 4, wherein said deflecting means includes a housing for said tube having an air and fuel vapor entrance disposed between said basin floor and said end in flow communication with the latter.

6. In a treater as claimed in claim 5, wherein said housing is electrically conductive, and wherein is provided an electrically conductive wall circumscribing said housing in spaced relationship thereto, said housing and said wall being adapted for connection across a source of electrical potential to establish said electrostatic field therebetween.

7. In a treater as claimed in claim 6, wherein is provided a heat-exchange vane in said chamber extending helically about said housing between the latter and said wall for augmenting the condensing of water vapor during vaporization of said droplets.

8. In a treater as claimed in claim 7, wherein said housing, said vane and said wall are disposed in concentric relationship to one another.

9. In a treater as claimed in claim 6, wherein said tube is spaced from adjacent portions of said housing to define a passage for fuel vapor and air from said entrance to said end, said tube being electrically conductive for creation of a second electrostatic treating field within said passage.

10. In a treater as claimed in claim 9, wherein said housing and said tube are disposed in concentric relationship to one another.

11. In a treater as claimed in claim 4, wherein said deflecting means includes a baffle overlying said end in spaced relationship thereto.

12. In a treater as claimed in claim 11, wherein is provided a plurality of spaced-apart electrodes between said inlet means and said baffle, each adjacent pair of said electrodes being adapted for connection across a source of electrical potential for creation of a field therebetween.

13. In a treater as claimed in claim 12, wherein said electrodes are plate-like in configuration.

14. In a treater as claimed in claim 12, wherein said electrodes are adapted to restrict the mixture to a serpentine path of travel as the mixture flows between successive pairs of said electrodes whereby to break up the droplets.

15. In a treater as claimed in claim 1, wherein is provided an electrode in said chamber disposed to shield said outlet means from condensation.

16. In a treater as claimed in claim 15, wherein said electrode is tubular and houses said outlet means.

17. In a treater as claimed in claim 16, wherein said outlet means includes a tube housed within said electrode in spaced relationship to the latter to define an annular passage for air and fuel vapor.

18. In a treater as claimed in claim 16, wherein is provided a second tubular electrode housing said first-mentioned electrode in spaced relationship thereto.

19. In a treater as claimed in claim 1, wherein is provided a heat-enchange vane in said chamber for augmenting the formation of water condensation during vaporization of said fuel droplets.

20. In a treater as claimed in claim 19, wherein said vane extends helically in the chamber for swirling the mixture through said field.

21. In a treater as claimed in claim 1, wherein is provided a baffle shielding said outlet means against entry of condensation.

22. In a treater as claimed in claim 21, wherein is provided a plurality of superimposed, spaced-apart electrodes between said inlet means and the baffle for creating one or more electrostatic fields.

23. In a treater as claimed in claim 22, wherein said electrodes are disposed for heat-exchange contact with said mixture to augment condensing of the water vapor thereof during vaporization of said fuel droplets.

24. In a treater as claimed in claim 21, wherein said outlet means includes a tube underlying said baffle.

25. In a treater as claimed in claim 1, wherein said inlet means is constricted relative to said outlet means for producing reduced pressure in said chamber to expand and vaporize said fuel droplets.

26. In a method of treating a carbureted mixture of air, water vapor and droplets of an atomized volatile fuel, the steps of:
   passing the mixture through an electrostatic treating field to relax the surface tension of said fuel droplets for vaporization thereof;
   condensing water vapor from said mixture by directing the mixture into physical contact with heat-exchange structure during vaporization of said droplets; and
   separating water condensation from said air and vaporized fuel to produce a highly combustible, substantially water-free end product.

27. In the method as claimed in claim 26, wherein is provided the additional step of subjecting the droplets to reduced pressure during treatment by said field to enhance vaporization of the droplets.

28. In the method as claimed in claim 26, wherein is provided the additional step of swirling the mixture while it is exposed to said field.

29. In the method as claimed in claim 26, wherein is provided the additional step of passing the air and fuel vapor through a second electrostatic field after separation from the water condensation.

30. In the method as claimed in claim 26, wherein is provided the additional step of restricting the mixture to a tortuous, serpentine path of travel through the field to break up said droplets.

31. In the method as claimed in claim 26, wherein is provided the additional step of collecting the water condensation while allowing the air and fuel vapor to continue their flow.

* * * * *